(12) United States Patent
Dziewinski et al.

(10) Patent No.: US 6,436,275 B1
(45) Date of Patent: Aug. 20, 2002

(54) ELECTROCHEMICAL REDUCTION OF NITRATE IN THE PRESENCE OF AN AMIDE

(75) Inventors: Jacek J. Dziewinski; Stanislaw Marczak, both of Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/584,627

(22) Filed: May 31, 2000

(51) Int. Cl.$^7$ ................................................. C25C 1/00
(52) U.S. Cl. ...................................................... 205/617
(58) Field of Search ........................... 205/617, 491–493

(56) References Cited

U.S. PATENT DOCUMENTS

| | | | | |
|---|---|---|---|---|
| 4,312,722 A | * | 1/1982 | Yoshida | 205/492 |
| 5,376,240 A | | 12/1994 | Kaczur et al. | 204/128 |
| 5,871,620 A | | 2/1999 | Haug et al. | 204/157.15 |
| 6,030,520 A | * | 2/2000 | Dziewinski et al. | 205/771 |

OTHER PUBLICATIONS

S. Glasstone and A. Hickling, "Electrolytic Oxidation and Reduction: Inorganic and Organic", D. Van Nostrand Company, 223 (New York 1936).

Willkinson, "Electyrolysis of Nitric Acid Using a Mercury Cathode", Trans. Amer. Electrochem. Soc., 13, 309 (1908).
Miller and Weber, Z. Elektrochem. 9, 955 (1903).
Muller and Spitzer, Ber. 38, 1190 (1905).
W. J. Muller, Z. Elektrochem. 9, 978 (1903).
J. D. Genders et al., "Electrochemical Reduction of Nitrates and Nitrites in Alkaline Nuclear Waste Solutions", J. Appl. Electrochem. 26, 1 (1996).
Tscherbakov and Libina, Z. Elektrochem. 35, 70 (1929).
Freer and Higley, Amer. Chem. J. 21, 389 (1899).
G. Schmidt and G. Krichel, Ber. Bunsenges. 68, 667 (1964).
G. Schmidt and M.A. Lobeck, Ber. Bunsenges. 73, 667 (1969).

* cited by examiner

Primary Examiner—Donald R. Valentine
(74) Attorney, Agent, or Firm—Samuel M. Freund

(57) ABSTRACT

The electrochemical reduction of nitrates in aqueous solutions thereof in the presence of amides to gaseous nitrogen ($N_2$) is described. Generally, electrochemical reduction of $NO_3$ proceeds stepwise, from $NO_3$ to $N_2$, and subsequently in several consecutive steps to ammonia ($NH_3$) as a final product. Addition of at least one amide to the solution being electrolyzed suppresses ammonia generation, since suitable amides react with $NO_2$ to generate $N_2$. This permits nitrate reduction to gaseous nitrogen to proceed by electrolysis. Suitable amides include urea, sulfamic acid, formamide, and acetamide.

8 Claims, 3 Drawing Sheets

ELECTROCHEMICAL REDUCTION OF NITRATE IN THE PRESENCE OF AN AMIDE

STATEMENT REGARDING FEDERAL RIGHTS

This invention was made with government support under Contract No. W-7405-ENG-36 awarded by the U. S. Department of Energy to The Regents of The University of California. The government has certain rights in the invention.

FIELD OF THE INVENTION

The present invention relates generally to the reduction of nitrate in aqueous solutions and, more particularly, to the electrochemical reduction of nitrates in the presence of amides.

BACKGROUND OF THE INVENTION

Nitrate-containing solutions are used in weapons research and production. As a result, nitrate-containing wastes are generated. The steel, mining and chemical industries, and farming are also major generators of nitrate wastes. Such wastes contaminate natural waters if released into the environment; the strong oxidizing power of nitrates causes excessive biological activity, growth of the vegetation, and precipitation of organic residue to the bottoms of streams, rivers, lakes, and oceans. As a result of precipitation of organic residue from nitrate waste streams, water reservoirs become shallow and eventually are converted to marshes and decay. Nitrate contamination in drinking water can cause methemoglobinemia, which is especially detrimental to infants and nursing mothers.

Several methods for treating nitrates in waste streams have been developed which convert the nitrates to less environmentally hazardous substances, but no simple, economical process for the destruction of nitrates in aqueous solutions is known. Nitrates can be separated by physiochemical means such as reverse osmosis, ion exchange, electrodialysis, and evaporation, but these methods do not destroy the nitrate.

Although nitrates can be reduced to nitrogen gas and ammonia by biological procedures, this process is slow, difficult to control and results in an organic residue.

Supercritical water or wet air oxidation methods have also been applied to the destruction of nitrates. However, these methods require high temperatures and pressures, the inconsistent contents or concentrations of waste streams are problematic, and the products of nitrate reduction with supercritical fluids may contain undesirable $NO_x$ components.

In U.S. Pat. No. 6,030,520, for "Nitrate Reduction" which issued to Jacek J. Dziewinski and Stanislaw Marczak on Feb. 29, 2000, a method for solving this problem is described. Aqueous waste streams containing nitrates are first contacted with a metal such as cadmium or zinc in an amount sufficient to quantitatively reduce the nitrates to nitrites ($NO_3^-$ to $NO_2^{3+}$).

Both the nitrites and the metal cations are released into the solution or slurry that contained the nitrates. The resulting aqueous nitrite solution is then contacted with an amide reagent to reduce the nitrites to nitrogen and carbon dioxide or acid anions. The reduction of the nitrites to nitrogen may be carried out simultaneously with further nitrate reduction to nitrites or subsequent to the nitrate reduction. Reduction may be performed in the same vessel as the nitrate reduction or the solution may be pumped to another vessel. Amides which are useful in the practice of the invention are those which produce environmentally benign products during hydrolysis; for example, urea, sulfamic acid, formamide, acetamide and mixtures thereof. Urea and sulfamic acid reduce nitrites to nitrogen and carbon dioxide or sulfate anions, respectively. Use of too little amide results in incomplete conversion of the nitrites to nitrogen, while too much amide causes unnecessary reagent use and its residual presence in the treated solution. The pH of both the nitrate to nitrite reaction and the nitrite to nitrogen reaction is adjusted as necessary to obtain a weakly acidic reaction environment. When the aqueous solution or slurry is subjected to a direct current between an anode and cathode submersed therein, the cadmium, zinc or other metal will plate out on the cathode and can be recovered therefrom. Metal recovery by electroplating may be carried out in the same vessel as the nitrate reduction and may be carried out simultaneously with the nitrite to nitrogen reduction reaction, simultaneously with the nitrate to nitrite reduction reaction after the reduction step is completed, or as a final step of the overall process.

In U.S. Pat. No. 5,871,620 for "Process And Device for Reducing The Nitrate Content Of Water" which issued to Helmar Haug et al. on Feb. 16, 1999, nitrate is reduced to nitrogen in two stages. An ultraviolet photochemical reaction reduces the nitrate to nitrite followed by a reduction of the nitrite to nitrogen using amidosulfuric acid.

Direct electrochemical reduction of aqueous inorganic oxynitrogen species to nitrogen or ammonia is described in U.S. Pat. No. 5,376,240 for "Process For The Removal Of Oxynitrogen Species For Aqueous Solutions", which issued to Jerry J. Kaczur et al. on Dec. 27, 1994. The aqueous solution is fed into the catholyte compartment of an electrochemical reduction cell using a high surface area cathode separated form an anolyte compartment to electrochemically reduce substantially all of the oxynitrogen species to nitrogen or ammonia and produce a purified water product.

S. Glastone and A. Hickling on page 223 of "Electrolytic Oxidation and Reduction: Inorganic and Organic", D. Van Nostrand Company (New York 1936) state that during electrolysis at a copper cathode $HNO_3$ is generally reduced to ammonia, but the action of the acid on this metal yields nitric oxide as the chief product. It is further stated that this is the result of the presence of cupric ions during dissolution, and the absence of cupric ions during electrolysis. When $Cu^{++}$ ions are effectively removed during acid dissolution (quickly flowed away, precipitated and filtered) ammonia is principally formed. Reversibly, when copper sulfate is present during the electrolysis, nitric oxide easily evolves.

This reference also quotes Wilikinson, Trans. Amer. Plectrochem. Soc., 13, 309 (1908) as stating that electrolytic reduction of $HNO_3$ at a mercury cathode yields a large proportion of hydroxylamine, but if mercurous sulfate is added then nitric oxide can be obtained with 70% current efficiency.

At alkaline conditions a mixture of ammonia and nitrite were reported as products of nitrate electrolysis on copper, silver, iron and lead (See, e.g., Miller and Weber, Z. Elektrochem. 9, 955 (1903). Ammonia and very little nitrite resulted during nitrate electrolysis on platinized platinum (Muller and Spitzer, Ber. 38, 1190 (1905)). Saturated pH neutral solutions of sodium nitrate may be reduced to nitrite at an amalgamated copper cathode according to W. J. Muller, Z. Elektrochem. 9, 978 (1903)). Nitric oxide has been detected as a product of electrolysis of concentrated nitric acid with a platinum electrode (Glastone and Hickling, supra). In "Electrochemical Reduction Of Nitrates And Nitrites In Alkaline Nuclear Waste Solutions, by J. D. Genders et al., J. Appl. Electrochem. 26, 1 (1996), alkaline solutions of sodium nitrate and nitrite are electrochemically reduced to nitrogen, ammonia or nitrous oxide in a divided electrochemical flow cell using a lead cathode, a cation exchange membrane, and oxygen-evolving DSA or platinum clad niobium anode.

Nitrous oxide has been obtained by the reduction of $\geq 1$ M $HNO_3$ in sulfuric acid at a mercury cathode (See, e.g., Tscherbakov and Libina, Z. Elektrochem. 35, 70 (1929)). It may be considered as a dehydration product of hyponitrous acid, which is suspected to be a transient product of nitrate reduction. At concentrations lower than 1 M hydroxylamine it is the principal product.

Nitrogen was obtained as the principal reduction product with dilute $HNO_3$ (sp. Gr. 1.05) at very low current densities (1 to $5 \cdot 10^{-5}$ A/cm$^2$) at lead and silver cathodes (See, e.g., Freer and Higley, Amer. Chem. J. 21, 389 (1899)). According to Glastone and Hickling, supra, the fact that $N_2$ is obtained at very low current densities is evidence that it results from a side reaction and not from direct electrolysis. They propose the following reactions:

$$2HNO+2NH_2OH=2N_2+4H_2O, or$$

$$HNO_2+NH_3=NH_4NO_2=N_2+2H_2O.$$

The formation of ammonia at a platinum cathode was observed by some researchers but not by others. It has been reported by Ihle in Z. Physikal. Chem. 19, 572 (1896) that unless a certain current density, which depends on the concentration of the acid is exceeded, no ammonia is obtained. This critical current density increases with $HNO_3$ concentration. The minimum current density undoubtedly varies with the electrode material, for at a suitable copper cathode, or in presence of a copper salt, nitric acid can be readily and completely reduced to ammonia even at quite low current densities.

Although it appears that $HNO_2$ plays a major role in reduction of nitrates, there is considerable controversy on the mechanism of the reduction of nitrate to nitrous acid. See, e.g., Schmidt G., Ber. Bunsenges. 63, 667 (1959); G. Schmidt, Ber. Bunsenges. 65, 531 (1961); G. Schmidt and G. Krichel, Ber. Bunsenges. 68, 667 (1964); and G. Schmidt and M. A. Lobeck, Ber. Bunsenges. 73, 667 (1969)).

Thus, there remains a present need to efficiently and inexpensively destroy nitrates in solutions thereof using robust and simple apparatus without generating environmentally undesirable substances.

Accordingly, it is an object of the present invention to provide a method for converting nitrate wastes at moderate temperatures and pressures to more environmentally benign substances.

It is another object of this invention to provide a method of reduction of nitrates to nitrogen gas.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects of the present invention, and in accordance with its purposes, as embodied and broadly described herein, the method for reducing nitrate in aqueous solutions thereof to nitrogen ($N_2$) includes the step of electrochemically reducing the nitrate in the presence of at least one amide, whereby nitrogen is formed.

It is preferred that the amide is selected from the group consisting of urea, sulfamic acid, formamide, and acetamide.

In another aspect of the present invention in accordance with its objects and purposes, the method for reducing nitrate in aqueous solutions thereof to nitrogen ($N_2$) includes the steps of electrolytically reducing the nitrate thereby forming a solution containing aqueous nitrites, and mixing said solution of nitrites sufficiently rapidly with at least one amide such that nitrogen ($N_2$) is the principal product therefrom.

Preferably, the amide is selected from the group consisting of urea, sulfamic acid, formamide, and acetamide.

Benefits and advantages of the invention include an efficient, economical procedure for reducing the quantity of aqueous nitrates without generating environmentally harmful products, which can be performed using a simple apparatus.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
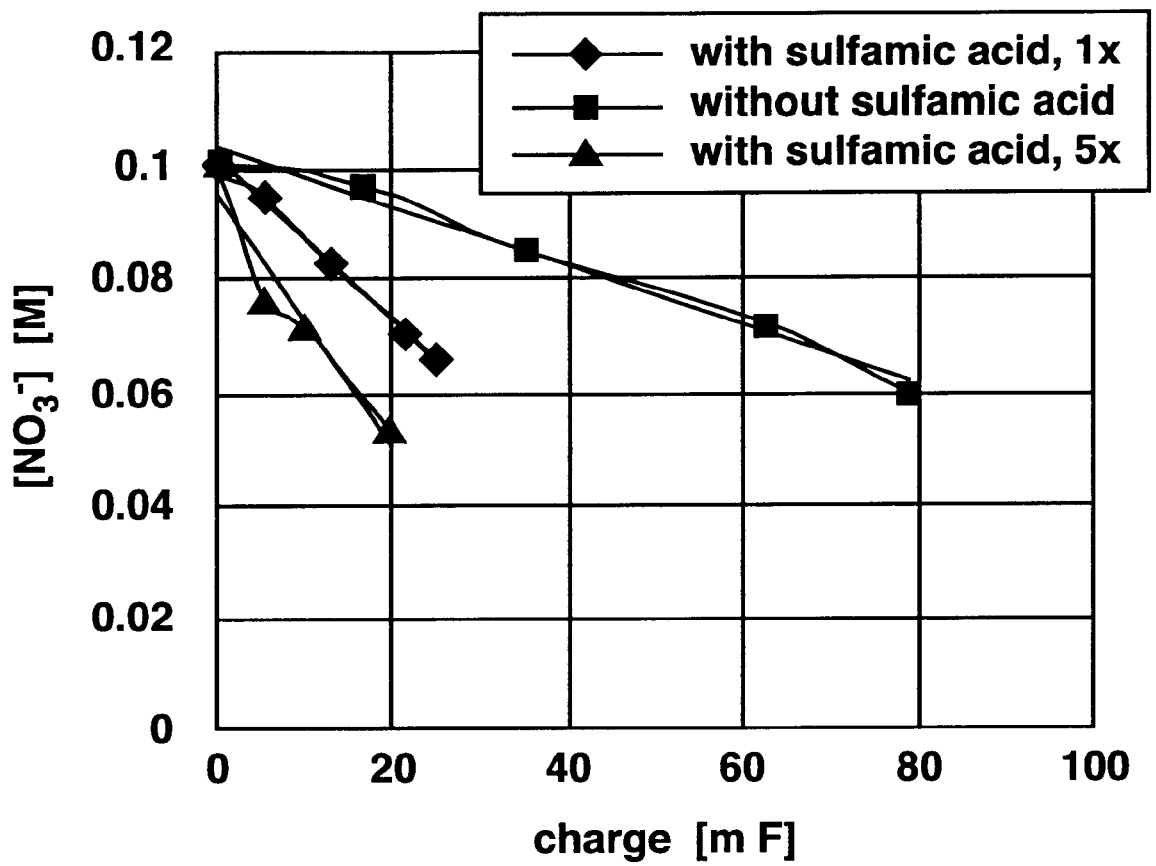
FIG. 1 is a graph of the nitrate concentration as function of charge showing that nitrate reduction proceeds more slowly when no sulfamic acid is present, while the most rapid reduction occurs when 5-fold excess of sulfamic acid was used.

Briefly, the present invention includes the electrochemical reduction of aqueous nitrates in the presence of amides to gaseous nitrogen ($N_2$). Generally, electrochemical reduction of $NO_3^-$ proceeds stepwise, from $NO_3^-$ to $NO_2^-$ and subsequently in several consecutive steps to generate ammonia (NHg) as a final product. Because $NO_3^-$ is the most inert species relative to reduction in the entire process, once $NO_3^-$ is reduced to $NO_2^-$, further electrolytic reduction proceeds rapidly to $NH_3^-$. Addition of an amide to the solution being electrolyzed suppresses ammonia generation, since certain amides react with NO2⁻ to generate $N_2^-$. This permits nitrate reduction to gaseous nitrogen to proceed by electrolysis. The important reactions are:

A. Electrolytic:

$$NO_3^-+2H^++2e^-=NO_2^-+H_2O \text{(cathode)} \quad (1)$$

$$H_2O-2e^-=2H^++\tfrac{1}{2}O_2 \text{(anode)} \quad (2), and$$

B. Chemical:

$$NO_2^- + H_2NA = N_2 + AO^- + H_2O \quad (3),$$

where A denotes the organic or inorganic portion of an amide denoted here as $H_2NA$. As stated hereinabove, in the absence of a suitable amide, nitrate is reduced to ammonia as the main product according to the following overall reaction:

$$NO_3^- + 9H^+ + 8e^{-1} = NH_3 + 3H_2O \text{(cathode)} \quad (4).$$

Having generally described the present invention, the following EXAMPLES provide additional details thereof. In the EXAMPLES, 0.1M $KNO_3$ was electrolyzed in a glass vessel equipped with a magnetic stirrer. Approximately 200 ml of solution was used for each EXAMPLE. The pH of the solutions were maintained at less than 8. A copper sheet having an area of 33 cm² was utilized as the cathode, and a corrosion-resistant, dimensionally stable anode (DSA) having the same dimensions as the cathode (5.5 cm x 5 cm) served as the anode for the first three EXAMPLES. A copper wire coil 2 mm in diameter and 50 cm long (31 cm²) was employed as the cathode in final EXAMPLE. The electrodes were prepared by (1) polishing with 200 grit sand paper, (2) washing with deionized water, (3) soaking in 5M HCl for 5 min., and (4) again washing with deionized water before each use. All experiments were performed at constant voltage (3 V) and a current between 0.1 and 1 A. Sulfamic acid ($H_2NSO_3H$) was used as the amide in reaction (3) hereinabove which then becomes:

$$NO_2^- + H_2NSO_3^- = N_2 + SO4^{2-} + H_2O \quad (3a).$$

EXAMPLE 1

No sulfamic acid was used and 0.05 M $H_2SO_4$ was used instead to assure the same acidity as if sulfamic acid were used.

EXAMPLE 2

A 0.1 M solution of sulfamic acid ($H_2NSO_3H$) was added such that the sulfamic acid was equimolar to $KNO_3$.

EXAMPLE 3

Figure 2:
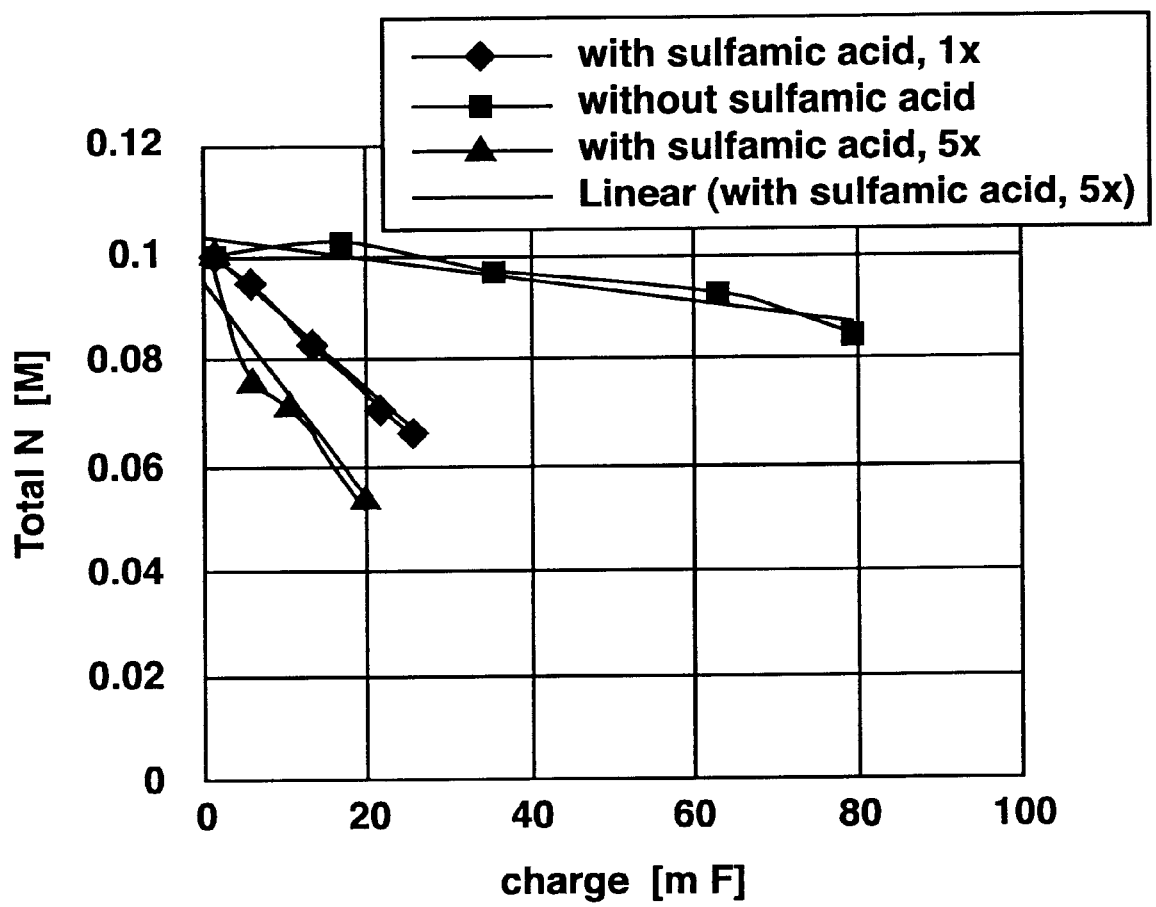
FIG. 2 is a graph of the total nitrogen (N) concentration as a function of charge, showing that N decreases more slowly in the absence of sulfamic acid because of ammonia accumulation in the solution.
Figure 3:
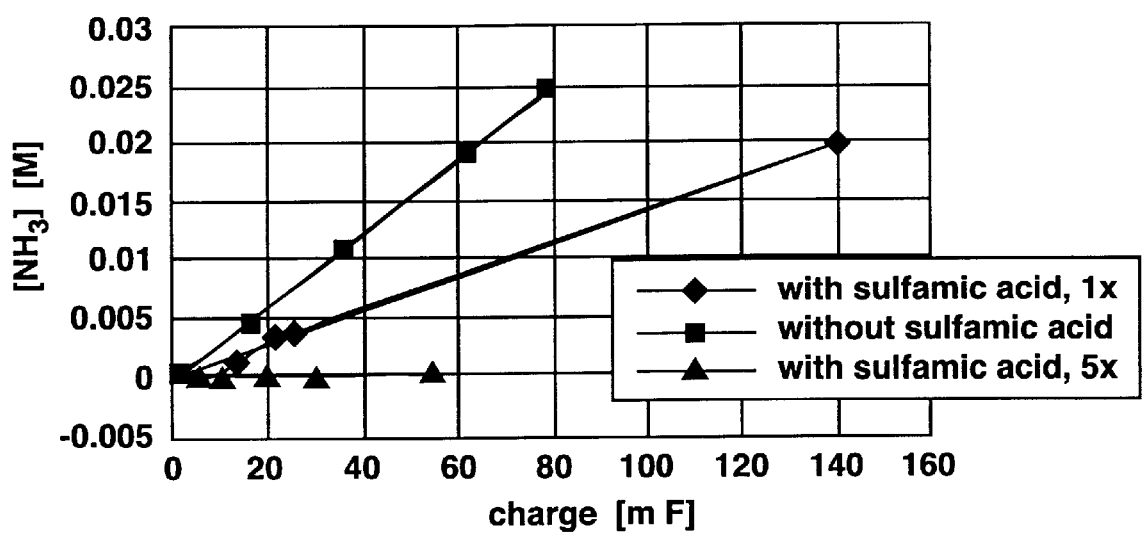
FIG. 3 is a graph of the ammonia concentration as a function of charge, showing that there is substantial ammonia generation during electrolysis without sulfamic acid, significantly lower ammonia generation when equimolar quantity of sulfamic acid was used, and no ammonia was detected when the five-fold equimolar excess of sulfamic acid was used.

Sulfamic acid was used at five times the molar quantity of $KNO_3$. FIG. 1 is a graph of the nitrate concentration as function of charge for EXAMPLES 1 through 3. The reduction of nitrate is seen to proceed more slowly when no sulfamic acid is present, while the most rapid reduction occurs when 5-fold excess of sulfamic acid was used. FIG. 2 is a graph of the total nitrogen (N) concentration as a function of charge. N decreases more slowly in the absence of sulfamic acid because of ammonia accumulation in the solution. The decrease in N is equal to the decrease of nitrate ($NO_3^-$) in the situation where a 5-fold excess of sulfamic acid is used. FIG. 3 is a graph of the ammonia concentration as a function of charge. It is seen that there is substantial ammonia generation during electrolysis without sulfamic acid, significantly lower ammonia generation when an equimolar quantity of sulfamic acid is used, and no ammonia is detected when a five-fold molar excess of sulfamic acid is used.

EXAMPLE 4

EXAMPLE 4 was performed in a similar fashion to that of EXAMPLE 3 except that any gases evolving from the electrolytic vessel were captured. The copper cathode was enclosed using a glass cylinder initially filled with the electrolyte solution and the generated gases were collected by water displacement. No ambient air entered the gas space in the cylinder.

The TABLE shows the mass spectrometry analysis of the gas generated in the cylinder. The presence of hydrogen is explained by water decomposition at the cathode, which accounts for a lower than 100% current efficiency for nitrate reduction. It is estimated that the current efficiency for nitrate reduction was approximately 50%. The presence of oxygen is explained by the anodic generation in accordance with reaction (2). No significant quantity of oxides of nitrogen were found in the collected gases, while the abundance of $N_2$ proves that the nitrate was reduced to gaseous nitrogen.

TABLE

| Species | Mole % |
|---------|--------|
| $H_2$ | 26.4 |
| $NH_3$ | Not detected |
| $N_2$ | 25.5 |
| NO | 0.014 |
| $O_2$ | 47.9 |
| Ar | 0.071 |
| $CO_2$ | 0.066 |
| $N_2O$ | 0.062 |
| $NO_2$ | Not detected |

The foregoing description of the invention has been presented for purposes of illustration and description and is not intended to be exhaustive or to limit the invention to the precise form disclosed, and obviously many modifications and variations are possible in light of the above teaching. For example, as long as the nitrites formed in the reduction of the nitrates are rapidly reacted with a suitable amide before secondary reactions can take place in the vicinity of the cathode, the amide does not have to be present at the cathode. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for reducing nitrate in aqueous solutions thereof comprising the step of electrochemically reducing the nitrate at a negative electrode in the presence of at least one reactive amide, whereby nitrogen ($N_2$) is formed.

2. The method for reducing nitrate in aqueous solutions thereof to nitrogen as described in claim 1, wherein said amide is selected from the group consisting of urea, sulfamic acid, formamide, and acetamide.

3. The method for reducing nitrate in aqueous solutions thereof to nitrogen as described in claim 1, wherein the negative electrode employed in said step of electrochemically reducing the nitrate includes at least one metal selected from the group consisting of copper, lead, zinc, cadmium, aluminum, iron, chromium, and nickel.

4. The method for reducing nitrate in aqueous solutions thereof to nitrogen as described in claim 1, wherein the pH of said aqueous solution is maintained at less than 8.

5. A method for reducing nitrate in aqueous solutions thereof to nitrogen comprising the steps of electrochemically reducing the nitrate to nitrite at a negative electrode, thereby forming a solution containing aqueous nitrites, and mixing said solution of nitrites with at least one amide such that the nitrites therein react principally with the amide, whereby nitrogen is formed.

6. The method for reducing nitrate in aqueous solutions thereof to nitrogen as described in claim 5, wherein said amide is selected from the group consisting of urea, sulfamic acid, formamide, and acetamide.

7. The method for reducing nitrate in aqueous solutions thereof to nitrogen as described in claim 5, wherein the negative electrode employed in said step of electrochemically reducing the nitrate includes at least one metal selected from the group consisting of copper, lead, zinc, cadmium, aluminum, iron, chromium, and nickel.

8. The method for reducing nitrate in aqueous solutions thereof to nitrogen as described in claim 5, wherein the pH of said aqueous solution of nitrate is maintained at less than 8.

* * * * *